United States Patent Office

3,582,263
Patented June 1, 1971

3,582,263
SOLVENT EXTRACTION PROCESS FOR SEP-
ARATING GADOLINIUM FROM TERBIUM
AND DYSPROSIUM
Vincent Chiola, Tai K. Kim, and Robert E. Long, Jr.,
Towanda, and Brooks C. Martin, State College, Pa.,
assignors to Sylvania Electric Products Inc.
No Drawing. Filed Oct. 31, 1969, Ser. No. 873,128
Int. Cl. C01f 17/00; C22b 59/00
U.S. Cl. 23—22                                   7 Claims

ABSTRACT OF THE DISCLOSURE

A process for the purification of gadolinium wherein an aqueous solution containing gadolinium values and heavy rare earths is contacted with an organic extraction solution consisting essentially of didecyl phosphoric acid, tributyl phosphate and an aliphatic hydrocarbon solvent to thereby remove an appreciable amount of the heavy rare earths into the organic phase without an appreciable removal of gadolinium from the aqueous phase.

BACKGROUND OF THE INVENTION

This invention relates to gadolinium purification from an aqueous solution containing gadolinium and heavy rare earths of the lanthanide series (having an atomic number greater than 64). More particularly, it relates to a solvent extraction process for the purification of gadolinium.

With the advent of rare earth phosphors that are useful in color television primarly as red-emitting phosphors, there has been a need for high purity rare earth materials. Even the commercial grades of sources of rare earth materials contains not only the particular element desired but also at least minor amounts of the rare earth elements. For example, commercial grade gadolinium oxides contain up to 1% by weight of other rare earth elements. Because of similar properties it has been extremely difficult to obtain highly pure individual rare earth elements. The presence of other rare earths, even in relatively minute amounts, has been found to lower the brightness of the subsequently produced phosphor. The primary rare earth phosphors that have been used commercially are the yttrium compounds, that is, yttrium orthovanadate, yttrium oxysulfide and yttrium oxide. Recently gadolinium oxide and mixed yttrium-gadolinium oxides have been found to have certain properties that make them attractive from a commercial standpoint providing that satisfactory purity of raw materials is achieved.

In allowed co-pending patent application Ser. No. 703,027, filed Feb. 5, 1968, now U.S. Pat. 3,482,932 and in co-pending patent applications Ser. No. 858,340, Ser. No. 858,341 and Ser. No. 858,515, each filed Sept. 16, 1969, certain improvements to rare earth purification are disclosed. Each of the foregoing patent applications are assigned to the same assignee as the present invention. Each of these applications disclose improvements, however, in most instances the desired rare earth element has been yttrium and in such processes the yttrium is recovered from an organic extractant solution as a heavy rare earth. It can be appreciated that different problems result when the desired rare earth material is one that is concentrated in the aqueous phase rather than in the organic phase. When using a solvent extraction step, a separation between the light and the heavy rare earths is achieved. For example, in the purification of yttrium the primary objects of the extraction step are to extract a maximum amount of yttrium and to not extract any appreciable amount of the lighter rare earths. Separation between yttrium and the heavy rare earths is conducted in a subsequent step. If in the yttrium purification terbium and dysprosium are not extracted into the organic phase there are no adverse effects on the purification of yttrium as long as yttrium is extracted. In the purification of gadolinium, however, it is highly desirable that gadolinium remain in the aqueous phase and terbium and dysprosium along with the other heavy rare earth be extracted into the organic phase.

It is believed therefore a solvent extraction step that enables a good separation between gadolinium of the lighter rare earths and terbium and dysprosium of the heavy rare earths would be an advancement in the art.

SUMMARY OF THE INVENTION

In accordance with one aspect of this invention there is provided a process for the purification of gadolinium. The process comprises contacting an aqueous solution containing gadolinium and the heavy rare earth elements with a three-component water-insoluble solvent extraction solution consisting essentially of didecyl phosphoric acid, tributyl phosphate and an aliphatic hydrocarbon solvent for a sufficient time to remove an appreciable amount of the heavy rare earths from the aqueous stream into the resulting organic phase and thereafter separating the organic phase from the aqueous phase and thereafter recovering said gadolinium from the aqueous phase.

For a better understanding of the present invention, together with other and further objects, advantages and capabilities thereof, reference is made to the following disclosure and appended claims in connection with the above description of some of the aspects of the invention.

DESCRIPTION OF THE PREFERRED EMBODIMENTS

The organic extractant solution utilized in this invention has been found to be particularly useful in the purification of gadolinium. In the manufacture of gadolinium-containing phosphors, terbium (At. No. 65) and dysprosium (At. No. 66) have been found to be highly undesirable contaminants. Even though the atomic numbers are extremely close between the three elements it has been found that the three component extraction system of this invention is highly effective for separating the undesired rare earth elements from gadolinium.

The active organic extracting agent is didecyl phosphoric acid. Tributyl phosphate serves as a modifier to achieve good phase separation and its presence improves the separation factors between Gd and Dy+Tb. An aliphatic hydrocarbon is used as a diluent or solvent for the organic extracting agent.

Volumetric ratios of didecyl phosphoric acid to tributyl phosphate can be from about 10:1 to about 0.57:1, with ratios of from about 2.67:1 to about 0.57:1 being preferred. A volumetric ratio of didecyl phosphoric acid to tributyl phosphate of 1.75:1 is especially preferred.

Useful solvents are generally the aliphatic hydrocarbon solvents that have a flash point above about 100° F. and that are relatively water-insoluble and will dissolve at least about 25% by volume of didecyl phosphoric acid and tributyl phosphate. By relatively water-insoluble it is meant that less than about 3 grams of the aliphatic hydrocarbon will dissolve in 100 cc. of water at 25° C. Kerosene is the preferred solvent. However, other aliphatic hydrocarbons that will dissolve the organic extractant and are relatively water-insoluble in accordance with the above description are suitable.

The maximum amount of didecyl phosphoric acid has been found to be about 21% by volume. In most instances it is preferred to use from about 4% to about 7% of the organic extractant that is didecyl phosphoric acid. Although amounts of less than about 4% of active organic extractants can be used, the number of extraction stages necessary to achieve satisfactory gadolinium recovery becomes impractical. Use of above about 21% results in inadequate phase separation and the inherent inefficiency associated therewith.

Although the organic solvent extractant solution as described herein achieves purification of gadolinium on a batch basis, for many commercial applications a continuous process can be preferred. The organic extraction solution can be regenerated by removal of the heavy rare earths contained therein and recycled. The regenerated organic extraction solution has been found to demonstrate extraction efficiencies approaching those of new or virgin organic extraction solutions.

The organic extractant solution utilizing the practice of this invention will achieve satisfactory purification over a relatively wide pH range in the gadolinium containing aqueous phase. A pH range of from about 1.3 to about 3.5 can be utilized with a pH range of from 1.5 to about 3.0 being preferred.

Relatively concentrated aqueous solutions can be processed by the practice of this invention. Feed solutions having a concentration of gadolinium of up to about 150 grams/liter and containing over about 100 parts per million of heavy rare earths can be satisfactorily processed, that is, over about 90% of the gadolinium will be recovered with a sufficient purity to enable high brightness phosphors to be produced therefrom. For purposes of efficiency a feed solution having a gadolinium concentration of from about 100 to about 125 grams per liter is preferred.

A volumetric phase ratio of organic extractant solution to aqueous solution containing the gadolinium and the heavy rare earths of from about 0.75:1 to about 1.5:1 is preferred with a 1:1 volumetric ratio being especially preferred. Higher ratios of organic to aqueous increases the amount of gadolinium that is extracted into the organic phase and although with stripping techniques these values can be recovered, it is preferred to minimize the amount of gadolinium that has to be recovered via a stripping operation.

Relatively short periods of contact time between the organic and aqueous phases are required to achieve satisfactory purification of gadolinium. From about 10 minutes to about 30 minutes of contact time has been found to be sufficient. A contact time greater than about 30 minutes can be used but provides no additional benefits, therefore, are not required. Contact times of less than about 10 minutes can be used, however, this can result in incomplete separation of gadolinium and the heavy rare earths and can require additional extraction stages to achieve the degree of separation generally desired.

After the phases have been in contact for the amount of time heretofore specified, they are allowed to separate. In a batch process the separation is achieved by discontinuing agitation for a period of about at least 20 minutes. If a continuous process is used, a separate vessel can be used wherein the retention time is equivalent to the foregoing separation time. Shorter separation times will result in inadequate separation. In most instances a time period of at least about 30 minutes is preferred, although longer times can be used. However, no appreciable benefits are achieved over a 30 minute separation time.

The process of this invention will yield satisfactory purification of gadolinium from heavy rare earths without additional treatment to the aqueous phase other than precipitating the gadolinium from the aqueous solutions as hereinafter described. It has been found, however, that the lighter rare earth, that neodymium (At. No. 60) in amounts above about 25 p.p.m. will tend to lower the brightness of the subsequently produced gadolinium phosphor. As a result, when the neodymium content of the raw material is greater than about 25 p.p.m. after the aqueous phase has contacted the organic phase and been separated therefrom the aqueous phase should be cycled to a cation exchange resin to separate the gadolinium. A 0.015 M aqueous solution of diethylenetriaminepentacetic acid (DTPA) has been found to be suitable as an eluting agent for ion exchange processing.

As previously mentioned, the benefits of this invention can be achieved in a continuous process. For example, the contact between the solvent extraction solution and the aqueous solution can be done in a vessel equipped with an agitator with organic and aqueous streams being added at a continuous rate. The design of the vessel and the degree of agitation should be such that the beforementioned contact time is achieved. A mixture of organic and aqueous feed streams can overflow into a settler that has the sufficient design so that the retention time in the vessel is sufficient to achieve adequate separation between the two phases. The aqueous phase can be analyzed for neodymium and gadolinium content if the amount of neodymium is greater than about 25 p.p.m. based on the gadolinium content then further separation via ion exchange should be undertaken if the ultimate use of the gadolinium is a red-emitting phosphor.

The organic extractant solution can be regenerated by contacting the extractant solution with a stripping solution to remove the heavy rare earths that are extracted ino the organic extractant solution. For example, the heavy rare earths react with the stripping solution such as an aqueous nitric acid solution to form acid soluble rare earth compounds and thereby yield an organic extractant solution that is essentially free of rare earth elements and can be recycled to the extraction step.

To more fully illustrate the subject invention the following detailed examples are presented. All parts, proportion and percentages are by weight unless otherwise specified.

Example 1

One of the techniques used to determine the effectiveness of extractants is by the use of minor amounts of radioisotopes of the various elements in a more concentrated solution. By this procedure an extractant can be used to contact a given solution and the distribution coefficient ($K_d$) that is, the ratio of the amounts of the particular elements in the extractant phase to the amount of the element in the aqueous phase. Comparison of distribution coefficients between two elements is a measure of the effectiveness of separation. The ratio of $K_d$'s of the elements is known as the separation factor. Therefore, in the purification of gadolinium it is desired to have relatively low values for distribution coefficient for gadolinium as possible indicating that relatively low amounts of gadolinium are extracted and relatively high values for separation factors between gadolinium (At. No. 64) and the heavy rare earths, particularly terbium (At. No. 65) and dysprosium (At. No. 66).

Using the above techniques aqueous solutions are prepared that contain about 150 g./liter of gadolinium oxide from technical grade gadolinium oxide that is known to contain over 100 p.p.m. of heavy rare earths. The feed solution at a pH of about 2.25 is doped with a relatively small amount of the appropriate radioisotopes of the various elements, that is, Gd, Tb and Dy.

Extractant solutions are prepared in which various organophosphoric acids are used in conjunction with tributyl phosphate as a modifier and kerosene as the solvent. Analytical results indicate the distribution coefficients and Separation Factors as shown in Table I.

TABLE I

| Alkyl phosphoric acid | Distribution coefficient | | | Separation factor | |
|---|---|---|---|---|---|
|  | Gd | Tb | Dy | Tb/Gd | Dy/Gd |
| Didecyl | 0.20 | 0.82 | 2.79 | 4.10 | 13.95 |
| Tridecyl | 0.23 | 0.55 | 1.43 | 2.46 | 6.35 |
| Octyl | 0.21 | 0.50 | 1.43 | 2.38 | 6.80 |
| Isooctyl | 0.29 | 0.84 | 1.99 | 2.90 | 6.86 |
| Monohexadecyl | 0.08 |  | 0.43 |  | 5.38 |
| Di-2-ethylhexyl | 0.18 | 0.58 | 1.58 | 3.22 | 8.78 |

The foregoing data indicate that the organic extraction solution containing didecyl phosphoric acid is considerably superior to other similar alkylphosphoric acids. The distribution coefficient for Gd is relatively low (0.2) indicating that no appreciable amount of Gd is extracted into the organic phase. The separation factors between Gd and Tb and between Gd and Dy are higher than any of the other solution containing the similar alkyl phosphoric acids. The separation factors indicate good separation between Gd and the heavy rare earths.

Example 2

The same procedure as in Example 1 is followed except that the alkylphosphoric acid is held constant and the other materials are used as modifiers. Additionally, the concentration of $Gd_2O_3$ in the aqueous solution is about 53 grams/liter. The analytical results of samples show the distribution coefficients and separation factors as given in Table II.

TABLE II

| Co-extractant | Distribution coefficient | | | Separation factor | |
|---|---|---|---|---|---|
| | Gd | Tb | Dy | Tb/Gd | Dy/Gd |
| Tri-n-butyl phosphate | 0.17 | 0.56 | 1.72 | 3.35 | 10.23 |
| Tri-n-butoxyethyl phosphate | 0.13 | 0.40 | 0.93 | 3.07 | 7.11 |
| Diamyl amyl phosphonate | 0.20 | 0.61 | 1.65 | 3.01 | 8.11 |
| Hexanol | 0.13 | 0.45 | 1.22 | 3.42 | 9.28 |
| Tri-n-octylphosphine oxide | 0.19 | 0.63 | 1.29 | 3.32 | 6.78 |

The above data indicate that tributyl phosphate is superior from the overall gadolinium-heavy rare earth (Tb and Dy) separation standpoint than other similar co-extractants since the combined separation factors of Tb/Gd and Dy/Gd is considerably higher than the other similar co-extractants.

Examples 1 and 2 indicate that an organic extractant solution containing didecyl phosphoric acid and tri-n-butyl phosphate is appreciably superior to organic extractant solution employing other extractants.

Example 3

Using the same techniques as given in Example 2 various levels of didecylphosphoric acid and tri-n-butyl phosphate are tested. Analytical results indicate the distribution coefficients, separation factors and the weight percent of the rare earths extracted as shown in Table III.

TABLE III

| Organic phase percent by volume | | Distribution coefficient ($K_d$) and percent extraction in parenthesis | | | Separation factor | |
|---|---|---|---|---|---|---|
| DDPA | TBP | Gd | Dy | Tb | Dy/Gd | Tb/Gd |
| 11 | 0 | 0.29 (22.60) | 1.36 (57.04) | 0.77 (43.63) | 4.66 | 2.65 |
| 10 | 1 | 0.31 (23.83) | 2.57 (71.95) | 1.34 (57.33) | 8.20 | 4.29 |
| 9 | 2 | 0.27 (21.07) | 1.77 (63.95) | 1.27 (55.96) | 6.64 | 4.76 |
| 8 | 3 | 0.25 (20.06) | 2.29 (69.59) | 1.09 (52.17) | 9.12 | 4.35 |
| 7 | 4 | 0.23 (18.36) | 2.94 (74.61) | 1.06 (51.36) | 13.06 | 4.69 |
| 4 | 7 | 0.13 (11.19) | 2.16 (68.30) | 0.65 (39.24) | 17.10 | 5.17 |

Example 4

Using a feed solution having a 150 g./liter $Gd_2O_3$ concentration and the techniques employed in the previous examples additional levels of didecyl phosphoric acid (DDPA) and tributyl phosphate (TBP) are tested. Results are given below.

The above data from Examples 3 and 4 indicate that an organic extractant solution containing from about 4% to about 21% by volume of didecyl phosphoric acid and from about 1% by volume to about 21% of tributyl phosphate with the remainder the hydrocarbon solvent is preferred and that a 7% didecyl phosphoric acid, 4% tributyl phosphate and 89% kerosene organic extraction solution when used to contact a feed solution containing about 150 g./liter of $Gd_2O_3$ yields especially good separation of gadolinium and the heavy rare earths (Dy and Tb) while extracting less than 10% of the gadolinium. Further tests with a feed solution having a $Gd_2O_3$ concentration of 100 grams/liter indicate that best results are achieved with the 7% didecyl phosphoric acid, 4% tributyl phosphate and 89% kerosene organic extractant solution. Additional tests in which the concentration of the feed is 50 g./liter, 100 g./liter and 125 g./liter and 150 g./liter of gadolinium oxide indicate that a concentration of from about 100 g./liter to about 125 g./liter is preferred from an extraction efficiency and separation standpoint.

Example 5

Nine runs are made using a variety of gadolinium oxides to be purified. The following technique is used. The impure gadolinium oxide is dissolved to form a feed solution by slurrying solid impure gadolinium oxide in water and adding concentrated nitric acid to the slurry until the oxide dissolves. About 1 cc. of nitric acid is generally required for every gram of gadolinium oxide.

An organic extractant solution is prepared by mixing the appropriate amounts of didecyl phosphoric acid, tributyl phosphate and kerosene as shown in Table V.

The aqueous feed solution and the organic extractant solution is mixed together for about 10 minutes. The ratio of the organic extractant solution and the aqueous feed solution is shown in Table V.

The mixture is then allowed to settle for about 30 minutes after which the two phases are separated. To the aqueous solution there is added ammonium hydroxide to raise the pH of the solution to about 4.25. The resultant solution is filtered and the pH is adjusted to about 1.9 with concentrated aqueous solution of nitric acid. To the resulting solution a saturated solution of oxalic acid is added until no additional precipitation of solid gadolinium oxalate is observed. The solid gadolinium oxalate is separated from the aqueous solution that remains, washed with acetone to remove any residual organic matter and air dried and fired using conventional techniques to produce a europium-activated gadolinium oxide phosphor. In runs 6-9 the organic regenerated from previous runs is used as the extractant solution. Results regarding the process, raw materials and the phosphors produced is shown in Table V.

TABLE IV

| Organic phase percent by volume | | Distribution coefficient ($K_d$) and percent extraction in parenthesis | | | Separation factor | |
|---|---|---|---|---|---|---|
| DDPA | TBP | Gd | Dy | Tb | Dy/Gd | Tb/Gd |
| 7 | 4 | 0.095 (8.68) | 1.66 (62.41) | 0.44 (30.51) | 17.47 | 4.62 |
| 12 | 21 | 0.29 (22.72) | 1.77 (63.90) | 0.61 (37.89) | 6.02 | 2.08 |
| 14 | 8 | 0.21 (17.01) | 2.75 (73.30) | 0.78 (43.82) | 13.40 | 3.80 |
| 14 | 10 | 0.23 (18.83) | 2.93 (74.56) | 0.71 (41.42) | 12.63 | 3.01 |
| 14 | 12 | 0.17 (14.60) | 2.87 (74.16) | 0.77 (43.41) | 16.78 | 4.49 |
| 14 | 14 | 0.28 (21.94) | 2.56 (71.91) | 0.68 (40.58) | 9.11 | 2.43 |
| 21 | 12 | 0.32 (24.07) | 3.68 (78.65) | 1.15 (53.57) | 11.62 | 3.64 |

TABLE V.—SUMMARY OF BATCH SCALE RESULTS

| | Aqueous phase | | Phase ratio, organic/ aqueous | Brightness of phosphor, percent | | Analysis on product by X-ray fluorescence, p.p.m. | | | | | | Recovery of Gd, percent |
|---|---|---|---|---|---|---|---|---|---|---|---|---|
| | Gd₂O₃, g./l. | pH | | Starting material | Product | Tb | Dy | Eu | Sm | Pr | Nd | |
| 1 | 7% DDPA 4% TBP 89% kerosene | 100.0 2.7 | 1:1 | 132 | 153 | ¹56(23) | ¹180(25) | ¹63(76) | ¹5.4(15) | ¹<1(<1) | ¹13(18) | 90 |
| 2 | 7% DDPA 4% TBP 89% kerosene | 100.0 2.7 | 1:1 | 144 | 158 | ¹46(18) | ¹53(12) | ¹16(11) | ¹35(30) | ¹<0.1(<1) | ¹14(14) | 98 |
| 3 | 7% DDPA 4% TBP 89% kerosene | 100.0 2.4 | 1:1 | 144 | 158 | ¹46(12) | ¹53(4) | ¹16(14) | ¹35(40) | ¹<0.1(<0.1) | ¹14(24) | 98 |
| 4 | 7% DDPA 4% TBP 89% kerosene | 100.0 1.5 | 1:1 | 110 | 110 | ¹8(1.5) | ¹82(9) | ¹9.8(3) | ¹90(41) | ¹3.5(0.1) | ¹140(84) | 90 |
| 5 | 7% DDPA 4% TBP 89% kerosene | 100.0 2.0 | 1:1 | 144 | 140 | ¹45(16) | ¹80(18) | ¹27(20) | ¹52(39) | ¹<0.1(<1) | ¹18(9) | 98 |
| 6 | Regenerated: 7% DDPA 4% TBP 89% kerosene | 100.0 2.0 | 1:1 | 144 | 150 | ¹45(19) | ¹80(16) | ¹27(14) | ¹52(40) | ¹<0.1(<1) | ¹18(9) | 97 |
| 7 | 7% DDPA 4% TBP 89% kerosene | 100.0 1.7 | 1:1 | 129 | 142 | 73 | 175 | 82 | 17 | <0.1 | 9.5 | 94 |
| 8 | 7% DDPA 4% TBP 89% kerosene | 100.0 1.6 | 1:1 | 143 | 149 | 54 | 29 | 0.4 | 5.0 | <0.1 | 4.8 | 92 |
| 9 | 7% DDPA 4% TBP 89% kerosene | 100.0 1.5 | 1:1 | 110 | 158 | ¹1.5(6) | ¹9(25) | ¹9(9) | ¹41(26) | ¹0.1(<1) | ¹84(0.5) | |

¹ Starting material; product (figures in parentheses).

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for the separation of gadolinium from an aqueous solution containing gadolinium, dysprosium and terbium values, said process comprising
    (a) contacting said aqueous solution with a three component water-insoluble extraction solution consisting essentially of from about 4% to about 21% by volume of didecyl phosphoric acid, from about 1% to about 21% by volume of tributyl phosphate and the remainder an aliphatic hydrocarbon solvent for a sufficient time to substantially remove the disprosium and terbium values into the resultant organic phase,
    (b) separating the resultant organic phase from the aqueous phase and
    (c) recovering said gadolinium values from said aqueous phase.

2. A process according to claim 1 wherein the volumetric ratio of didecyl phosphoric acid to tributyl phosphate is about 1.75:1.

3. A process according to claim 1 wherein the concentration of gadolinium in said aqueous solution is from metric ratio of said organic extractant solution to said about 100 to about 125 grams/liter.

4. A process according to claim 1 wherein the volu-aqueous solution is from about 0.75:1 to about 1.5:1.

5. A process according to claim 4 wherein said ratio is about 1:1.

6. A process according to claim 5 wherein said extraction solution contains about 7% by volume of didecyl phosphoric acid about 4% by volume of tributyl phosphate and about 89% by volume of kerosene.

7. A process according to claim 6 wherein after said separation of said aqueous and organic phases the dysprosium and terbium values are stripped from said organic phase and said organic solution is recycled.

References Cited

UNITED STATES PATENTS

| 2,859,094 | 11/1958 | Schmitt et al. | 23—312(ME) |
| 3,047,601 | 7/1962 | Johnson | 23—23X |
| 3,077,378 | 2/1963 | Peppard et al. | 23—23 |
| 3,214,239 | 10/1965 | Hozen et al. | 23—18X |
| 3,378,352 | 4/1968 | Hausen | 23—312X |
| 3,482,932 | 12/1969 | Gump | 23—22 |

OTHER REFERENCES

Pierce et al.: "Nature," vol. 194, Apr. 7, 1962, p. 84, 23/23.

HERBERT T. CARTER, Primary Examiner

U.S. Cl. X.R.

23—312, 23

PO-1050
(5/69)

UNITED STATES PATENT OFFICE
CERTIFICATE OF CORRECTION

Patent No. 3,582,263          Dated June 1, 1971

Inventor(s) Vincent Chiola, Tai K. Kim, Robert E. Long, Jr., and Brooks C. Martin It is certified that error appears in the above-identified patent and that said Letters Patent are hereby corrected as shown below:

Column 7, Claim 3 is incorrectly stated and should read as follows--

A process according to Claim 1 wherein the concentration of gadolinium in said aqueous solution is from about 100 to about 125 grams/liter.

Column 8, Claim 4 is incorrectly stated and should read as follows--

A process according to Claim 1 wherein the volumetric ratio of said organic extractant solution to said aqueous solution is from about 0.75:1 to about 1.5:1.

Signed and sealed this 14th day of December 1971.

(SEAL)
Attest:

EDWARD M. FLETCHER, JR.        ROBERT GOTTSCHALK
Attesting Officer               Acting Commissioner of Patents